Figure 1:
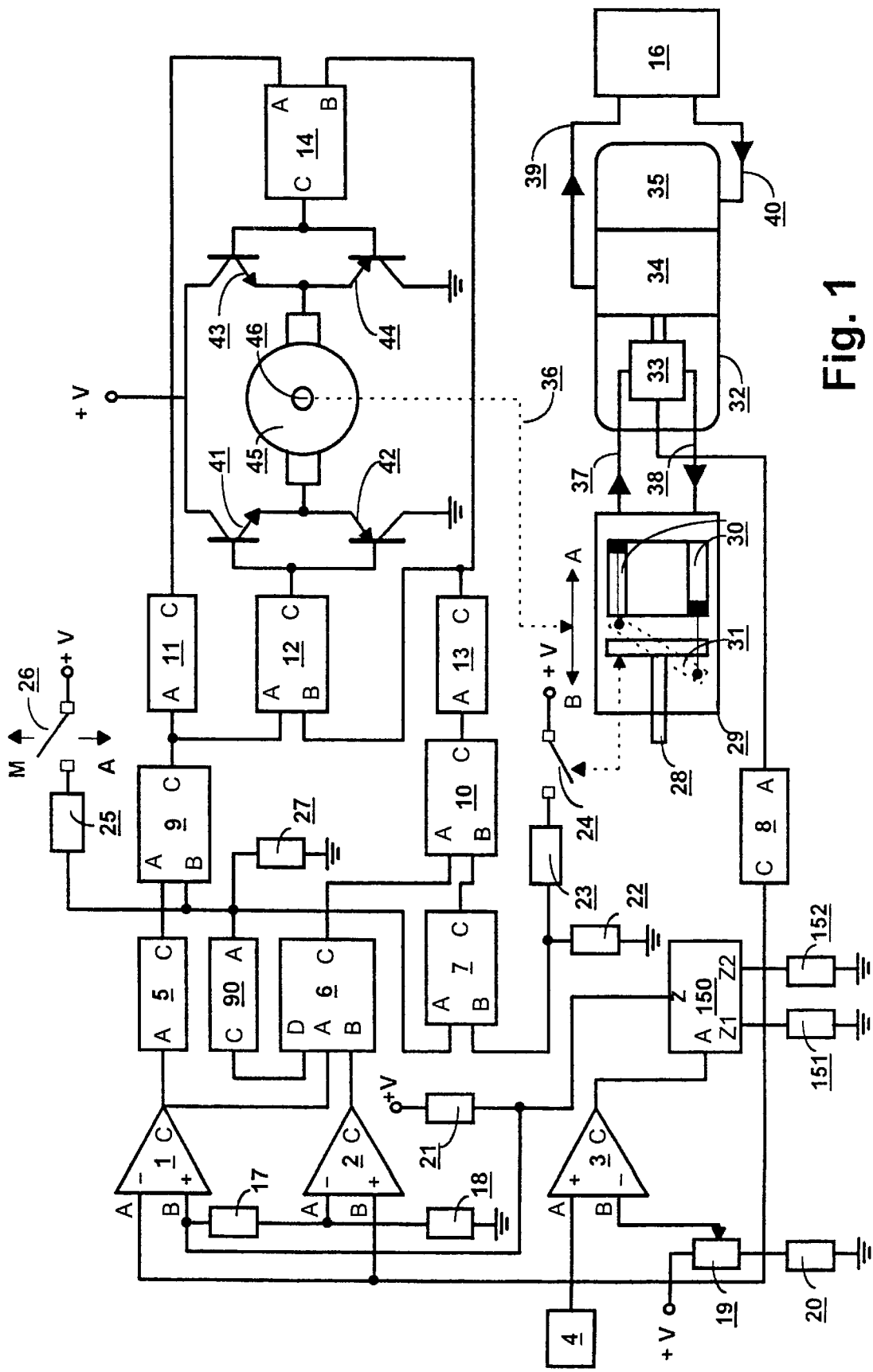

United States Patent [19]
Nathan

[11] Patent Number: 5,904,050
[45] Date of Patent: May 18, 1999

[54] MOTOR VEHICLE AIR CONDITIONING CONTROL SYSTEM

[75] Inventor: Guy Nathan, Yerres, France

[73] Assignee: Technical Maintenance Corporation, Las Vegas, Nev.

[21] Appl. No.: 08/930,760

[22] PCT Filed: Feb. 7, 1997

[86] PCT No.: PCT/FR97/00252

§ 371 Date: Nov. 10, 1997

§ 102(e) Date: Nov. 10, 1997

[87] PCT Pub. No.: WO97/28976

PCT Pub. Date: Aug. 14, 1997

[30] Foreign Application Priority Data

Feb. 9, 1996 [FR] France .................................. 96 01644

[51] Int. Cl.[6] .............................................. B60H 1/32
[52] U.S. Cl. ........................................ 62/228.4; 60/449
[58] Field of Search .............................. 62/228.4, 228.1; 60/449, 447

[56] References Cited

U.S. PATENT DOCUMENTS 2,101,495  12/1937  Ferris et al. ........................... 62/228.4
5,018,351   5/1991  Otte ........................................... 60/449

Primary Examiner—William Doerrler
Attorney, Agent, or Firm—Nixon & Vanderhye

[57] ABSTRACT

An air conditioning control system with a hermetic compressor for a motor vehicle is disclosed. The control system comprises a system for controlling the speed of the hermetic compressor (34) in such a way that the compressor driven by a variable-displacement pump assembly (30) coupled to a fixed-displacement hydraulic motor (33) rotates at a speed that is as close as possible to the rated compressor speed, and a sensor device (8) enables measurement of the rotation speed of the shaft of the hydraulic motor (33) connected to the compressor (34), so that a comparator (1) can change the forward direction of the plate (31) of the variable-displacement pump (30) depending on the changes in the speed of the hydraulic motor relative to a set speed.

6 Claims, 3 Drawing Sheets

| 1C | 2C | 3C | 5A | 5C | 9A | 9B | 9C | 11A | 11C | 12A | 12B | 12C | 14A | 14B | 14C |
|---|---|---|---|---|---|---|---|---|---|---|---|---|---|---|---|
| 1 | 0 | 1 | 1 | 0 | 0 | 0 | 0 | 0 | 1 | 0 | 1 | 1 | 1 | 1 | 0 |
| 6A | 6B | 6C | 7A | 7B | 7C | 10A | 10B | 10C | 13A | 13C | | | | | |
| 1 | 0 | 0 | 0 | 1 | 0 | 0 | 0 | 0 | 0 | 1 | | | | | |

Fig. 2A

| 1C | 2C | 3C | 5A | 5C | 9A | 9B | 9C | 11A | 11C | 12A | 12B | 12C | 14A | 14B | 14C |
|---|---|---|---|---|---|---|---|---|---|---|---|---|---|---|---|
| 1 | 1 | 1 | 1 | 0 | 0 | 0 | 0 | 0 | 1 | 0 | 0 | 1 | 1 | 0 | 1 |
| 6A | 6B | 6C | 7A | 7B | 7C | 10A | 10B | 10C | 13A | 13C | | | | | |
| 1 | 1 | 1 | 0 | 0 | 0 | 1 | 0 | 1 | 1 | 0 | | | | | |

Fig. 2B

——— Z1 (1B)
(1A, 2B) -------- Vit. Moteur
——— Z1 - $\varepsilon$ (2A)

| 1C | 2C | 3C | 5A | 5C | 9A | 9B | 9C | 11A | 11C | 12A | 12B | 12C | 14A | 14B | 14C |
|---|---|---|---|---|---|---|---|---|---|---|---|---|---|---|---|
| 0 | 1 | 0 | 0 | 1 | 1 | 0 | 1 | 1 | 0 | 1 | 1 | 0 | 0 | 1 | 1 |
| 6A | 6B | 6C | 7A | 7B | 7C | 10A | 10B | 10C | 13A | 13C | | | | | |
| 0 | 1 | 0 | 0 | 0 | 0 | 0 | 0 | 0 | 0 | 1 | | | | | |

Fig. 2C

Vit. Moteur -------- (2B, 1A)
Référence ——— Z2 (1B)
——— Z2 - $\varepsilon$ (2A)

| 1C | 2C | 3C | 5A | 5C | 9A | 9B | 9C | 11A | 11C | 12A | 12B | 12C | 14A | 14B | 14C |
|----|----|----|----|----|----|----|----|-----|-----|-----|-----|-----|-----|-----|-----|
| 0 | 1 | X | 0 | 1 | 1 | 0 | 1 | 1 | 0 | 1 | 1 | 0 | 0 | 1 | 1 |
| 6A | 6B | 6C | 7A | 7B | 7C | 10A | 10B | 10C | 13A | 13C | | | | | |
| 0 | 1 | 0 | 0 | 0 | 0 | 0 | 0 | 0 | 0 | 1 | | | | | |

Fig. 2D

| 1C | 2C | 3C | 5A | 5C | 9A | 9B | 9C | 11A | 11C | 12A | 12B | 12C | 14A | 14B | 14C |
|----|----|----|----|----|----|----|----|-----|-----|-----|-----|-----|-----|-----|-----|
| 1 | 0 | X | 1 | 0 | 0 | 0 | 0 | 0 | 1 | 0 | 1 | 1 | 1 | 1 | 0 |
| 6A | 6B | 6C | 7A | 7B | 7C | 10A | 10B | 10C | 13A | 13C | | | | | |
| 1 | 0 | 0 | 0 | 0 | 0 | 0 | 0 | 0 | 0 | 1 | | | | | |

Fig. 2E

| 1C | 2C | 3C | 5A | 5C | 9A | 9B | 9C | 11A | 11C | 12A | 12B | 12C | 14A | 14B | 14C |
|----|----|----|----|----|----|----|----|-----|-----|-----|-----|-----|-----|-----|-----|
| X | X | X | X | X | X | 1 | 1 | 1 | 0 | 1 | 1 | 0 | 0 | 1 | 1 |
| 6A | 6B | 6C | | | | 7A | 7B | 7C | 10A | 10B | 10C | 13A | 13C | 12C | 14C |
| X | X | 0 | | | | 1 | 0 | 0 | 0 | 0 | 0 | 0 | 1 | | |
| Lorsque le neutre est atteint | | | | | | 1 | 1 | 0 | 1 | 1 | 1 | 0 | 1 | 1 | |

Fig. 2F

MOTOR VEHICLE AIR CONDITIONING CONTROL SYSTEM

This invention relates to a motor vehicle air conditioning control system.

An all-or-none air conditioning control system that comprises a semi-hermetic compressor linked to an electromagnetic clutch, which are coupled either to the shaft of the heat engine or the propulsion engine or to the distribution outlet, is known. In general, the clutch is driven by the same belt as the one that also drives the alternator. Air conditioning is done during the coupling of the electromagnetic clutch, and the system operates on an all-or-none basis. When there is a need to produce refrigeration, the clutch couples the compressor to the heat engine or the propulsion engine. When the set temperature is reached, the clutch decouples the compressor, which ceases to produce refrigeration as long as the passenger compartment remains in the set temperature range.

Such a system offers the many drawbacks described below:

A semi-hermetic compressor has a performance level coefficient that is not very high for various reasons.

On the one hand, the airtightness of the rotating shaft is ensured by a seal which causes rubbing and wear; these produce microleaks, compromising the sealing of the compressor. These microleaks, which occur at the shaft output, are compensated by the presence of a refrigerating gas reservoir, which requires periodic refills.

On the other hand, the compressor is by necessity located close to the heat engine or the propulsion engine and consequently in a hot environment that is not very favorable to the production of refrigeration. Then, the poor output or the poor performance level coefficient results from the rotation speed of this compressor, which is directly related to the rotation speed of the heat engine or the propulsion engine, which varies between the lowest speed of 800 rpm and the highest speed, which is on the order of 6 to 6500 rpm.

A refrigerating compressor, however, has an output and an optimum refrigeration production for a well-defined nominal speed. This nominal speed of the compressor is generally on the order of 1500 or 1800 rpm.

The compressor is often supposed to produce maximum refrigeration when the speed of the heat engine or the propulsion engine is lowest due to, for example, the need for air conditioning in traffic jams or while idling. It is therefore necessary to size the system to produce the necessary refrigeration or the necessary refrigerating power for the lowest speed. Above this nominal speed, a safety valve system is triggered to create an internal pressure drop.

In addition, the electromagnetic clutch, which ensures the activation of the compressor, draws a great deal of electrical energy. This poses an electric balance problem for the motor vehicle manufacturer. The stress put on the battery by the air conditioning system becomes too great and makes it necessary to resize the capacity of the battery and sometimes even the alternator.

This electromagnetic clutch, which will operate on an all-or-none basis, will also contribute to poor output of the system in that when a compressor is stopped, it is necessary to start the thermodynamic cycle from scratch. With each restart, the thermodynamic irreversibilities are lost, and it is necessary to recompress the gas which, through evaporation, will produce refrigeration.

This all-or-none operation is a major drawback mainly for low-displacement vehicles or low-power vehicles. The torque that is demanded at the beginning of the cycle by the compressor is maximized. When the vehicle is idling, the power that is required, which is the product of torque times speed (power required by the compressor), creates the danger of engine stall. To overcome this drawback, the manufacturers say that, while the air conditioning is in use, the idling speed should be increased to a value generally on the order of 1100 rpm. This will help to increase pollution and raise fuel consumption.

The object of the invention is to overcome one or more of the drawbacks of the prior art.

This object is accomplished by virtue of the fact that the motor vehicle air conditioning control system with a hermetic compressor comprises a system for regulating the rotation speed of the hermetic compressor such that, regardless of the rotation speed of the heat engine or the propulsion engine, the compressor, which is driven by a variable-displacement pump assembly that is coupled to a fixed-displacement hydraulic motor, rotates at a speed that is as close to the nominal speed of the compressor as possible, and a sensor device makes it possible to measure the rotation speed of the hydraulic motor shaft that is connected to the compressor to cause the comparator to vary the direction of movement of the plate of the variable-displacement pump as a function of the changes in speed of the hydraulic motor relative to a set speed.

According to another particular feature, the displacement of the pump is caused to vary by modifying the inclination of a plate pump with a servomotor assembly that is controlled by electronic logic.

According to another particular feature, an end-of-travel circuit breaker of the plate that signals the neutral position of the plate causes the servomotor to shut down.

According to another particular feature, a regulation system that makes the displacement of the pump vary as a function of a set temperature and the temperature measured in the passenger compartment by a sensor.

According to another particular feature, another comparator makes it possible to determine two different set speeds: a first speed (Z2) that is close to the nominal speed of the compressor and lower than the former when the set temperature has been reached, with the servomotor causing the displacement of the pump to change in the direction opposite from that of the variation of the speed of the pump, and a second speed (Z1) which corresponds to a nominal speed.

According to another particular feature, a third comparator makes it possible for each set speed (Z1 or Z2) to determine a range ($\xi$) in which the servo is stopped, whereby the displacement of the pump no longer varies.

Other particular features and advantages of the invention will be described below in connection with a non-limiting embodiment of the invention that is shown in the attached figures in which:

FIG. 1 presents a general diagram of the motor vehicle air conditioning system;

FIGS. 2A to 2F present different status tables that represent the main operating conditions of the air conditioning system.

The invention comprises a hermetic assembly (32) in which is placed, inside the bell, a fixed-displacement hydraulic motor (33) which is supplied with oil by pipes (37, 38). In this diagram, the third pipe, which is used to recover the internal leaks of oil, is not shown. This hydraulic motor (33) is coupled to a compressor (34), which can be of the piston type or rotary type. Said compressor (34) is activated by hydraulic motor (33), to which hydraulic pipes (37, 38)

are connected. A gas reservoir (35) is connected to an output pipe (40) for decompressed gas that comes from the cooling system (16), which consists of, in a known way, an evaporator, a condenser, and a system of forced convection by ventilation. The compressor that is supplied by reservoir (36) feeds the refrigeration system via compressed gas pipe (39). A variable-displacement hydraulic pump (29), of the rotating plate type, is driven either by a belt that is connected to the heat engine or to a propulsion engine or directly at the distribution shaft output. A transmission-reduction system makes it possible to adapt the rotation speeds of this hydraulic pump (29). This transmission reduction depends on the type of displacement that is selected, the type of motor, and the power consumption. In general, the power that it takes to drive this hermetic compressor assembly will be between 400 and 2500 watts depending on the necessary refrigerating power, which itself depends on the volume of the passenger compartment, the insulation of the vehicle, and the number of glass surfaces. The transmission reduction system also makes it possible to ensure a mode of operation that is as close as possible to the nominal speed of compressor (34), even when the heat engine or propulsion engine is idling. This variable-displacement hydraulic pump (29) comprises a plate (31) with variable inclination and a series of pistons (30), of which only two are shown. The arrow in dotted lines (241) shows the connection of plate (31) to an end-of-travel circuit breaker (24) that is activated when plate (31) is in the neutral position which is indicated by solid lines, i.e., when pistons (30) are no longer moving, i.e., are no longer compressing the oil to obtain a zero flow rate. Thus, the heat engine or propulsion engine can continue to rotate, driving shaft (28) of pump (29) without producing air conditioning. This makes it possible to accomplish a very advantageous "gradual" clutching (without being all at once) upon start-up. To stop the production of refrigeration, it is sufficient to bring plate (31) to the neutral point. The inclination of this plate (31) will be controlled by, for example, an electric motor. This can also be an electromagnet system, however, which will trigger the shifting of the angle of the plate. To better explain the invention, we will give as an example in the selected embodiment a servomotor of the direct-current type, but this can also be a stepper motor. Direct-current motor (45), via possible transmission reduction (36), will act on the angle of plate (31) in a single direction between the neutral point and a positive angle, for example. A negative angle cannot be obtained since a mechanical stop limits the travel of the plate so that hydraulic motor (33) has the same direction of rotation as shaft (28), which follows the direction of rotation of the heat engine or the propulsion engine. By contrast, servomotor (45) will be able to rotate in the direction opposite to the hands of a clock (counterclockwise direction) or in the direction of the hands of a clock (clockwise direction). Arrows A and B (36) show the direction of displacement of the plate and correspond respectively to the directions of rotation of the servomotor. Servomotor (45) is connected to an H feed that is controlled by an assembly of logic circuits to make it possible to control three operations: a first direction of rotation that corresponds to the direction of the hands of a clock, a second direction of rotation opposite to the direction of the hands of a clock, and stopping. This assembly of logic circuits will makes it possible, on the one hand by two NAND gates (12, 14) and an OR function that consists of gate (9), to determine the direction of rotation and, on the other hand, by inverter 13, to determine the start of the servomotor or its stopping.

The assembly of logic circuits will make it possible to control and to regulate the air conditioning in the manner that we explain below. This assembly of logic circuits consists of a frequency voltage converter (8) that is connected to a sensor, for example such as a speedometer, that is mounted on the shaft of hydraulic motor (33) to convert the rotation speed of the shaft of hydraulic motor (33) into a frequency. The output of converter circuit (8) is connected to a negative input (1A) of a comparator circuit (1) which determines the direction of rotation of the servomotor whose output (1C) is connected, on the one hand, to input (5A) of an inverter circuit (5) and, on the other hand, at input (6A) of an AND gate (6) to three inputs (6A, 6B, 6D). Input (6D) of AND gate (6) is connected to output (90C) of an inverter (90) whose input (90A) is connected at the point that is common to two resistors (25, 27) that are mounted in series between the ground and a terminal of an on-off circuit breaker (26) whose other terminal is connected to the positive feed voltage. Circuit breaker (26) is open in the on position and closed in the off position.

Output (6C) of gate (6) is connected to input (10A) of a gate (10) of the OR type with two inputs, whose output (10C) is connected to input (13A) of an inverter gate (13). Output (13C) of this inverter gate is connected to two inputs B of each of two NAND gates (12, 14) whose outputs (12C, 14C) control the mid-point of the H assembly that is formed by NPN transistors (41, 43) and PNP transistors (42, 44), whose common point at the emitters is connected to the feed terminals of servomotor (45). The common point of the collectors of two NPN transistors (41, 43) is connected to the positive feed voltage. The collectors of two PNP transistors (42, 44) are connected to the ground. First input (12A) of the NAND gate (12) receives output (9C) of gate (9) of the OR type, and first input (14A) of gate (14) receives output (9C) of this gate (9) after having passed through an inverter (11). A first input (9A) of OR gate (9) receives output (5C) from gate (5), while second input (9B) of this gate (9) is connected to the point that is common to two resistors (25, 27).

Second input (10B) of OR gate (10) receives at output (7C) of two-input "AND" type gate (7). A first input (7A) of this gate is connected to the point that is common to two resistors (25, 27), and second input (7B) is connected to the point that is common to two other resistors (23, 22) which are mounted in series between the ground and a second circuit breaker (24) that is fed by the positive feed voltage. This circuit breaker (24) is controlled upon closure by plate (31) when the latter arrives at the so-called neutral position.

A temperature probe (4) with an amplifier makes it possible to measure the temperature of the passenger compartment and to provide a signal that corresponds to that at positive input (3A) of a comparator circuit (3), whose negative input (3B) is connected to a potentiometer (19), which makes it possible to set the set temperature that is desired for the passenger compartment. Potentiometer (19) is arranged in series with a projection resistor (20) of the potentiometer between the ground and the positive feed voltage. Output (3C) of comparator circuit (3) is sent to input A of an analog inverter (150) that is controlled by this output of the comparator. This analog inverter that makes available one of two inputs Z1 and Z2 at output Z according to the new logic that is available at input A. First input Z1 consists of a Zener diode (151) that is connected to the ground, and second input Z2 consists of a Zener diode (152) that is connected to the ground. When logic level (1) is present in input A, output Z is connected to diode Z1, and when the logic level is at level zero, output Z is connected to diode Z2. This output Z is connected, on the one hand, to a resistor (21) whose other end is connected to the positive potential and, on the other hand, to positive input B of first comparator (1). This input B is also connected by a resistor (17) to negative input A of a second comparator (2). Input A of this second comparator is also connected by a resistor (18) to the ground. Resistors (17, 18) are selected so that the signal to input (2A) is slightly less than the signal to input (1B) of comparator (1) or Z-ξ (i.e., Z1-ξ or Z2-ξ). A second positive input B of second comparator (2) is connected to output C of voltage frequency converter circuit (8). The operation of the circuit of the logic control assembly will now be described in connection with the status table and FIGS. 2A to 2F.

The operation of the device will be explained below. The object of the system is to have a constant rotation speed of compressor (34) as long as the set temperature has been reached, regardless of the rotation speed of the motor. The hydraulic pump and the control circuit will see to it that at the compressor plateau, this constant speed is, for example, 1500 rpm. Because of the thermal inertias inside the passenger compartment, the period for setting the temperature is always longer than the reaction time of the servomotor system. To take this into account, the system operates with two speed references, one (Z1) corresponding to the nominal speed of the compressor and the other (Z2) corresponding to a slightly lower speed, which are respectively defined by two Zener diodes (151, 152). This slightly lower speed having the purpose of reducing the production of refrigeration when the set temperature is reached without stopping the compressor by modifying, via the servomotor, the position of rotating plate (31) of the pump. The positions of the rotating plate of the pump can also be modified by the signals of comparators (1, 2) which determine the direction of rotation or the stopping of the servomotor as a function of the speed variation of the heat engine or of the propulsion engine. Circuit breaker (26) turns the air conditioning on and off. When it is closed, circuit breaker (24) indicates to the control system that the displacement of the pump is zero, i.e., that the plate is in the neutral position. Operation will depend basically on six different situations, which are shown by the various status tables of FIGS. 2A to 2F.

Upon activation, circuit breaker (26) is open, and the starting speed of the compressor is zero. Converter (8) does not feed information, the plate of hydraulic motor (31) is in the neutral position, and the temperature of the passenger compartment exceeds the set temperature. Under these conditions, the signal that is fed to input (1A) of comparator (1) is less than the signal that is fed to input (1B) of the same comparator since the speed is zero. Then, the signal that is fed to input (2A) of comparator (2) exceeds the signal that is fed to input (2B). Furthermore, since the temperature of the passenger compartment exceeds the set temperature, the signal to input (3A) will exceed the signal to input (3B).

Because of these conditions, it is necessary that the displacement of the pump increase so as to increase the rotation speed of the compressor since the latter was stopped. To do this, plate (31) is to move in the direction of arrow A, and motor (45) is to rotate in the counterclockwise direction. Taking into account the conditions at the inputs of comparators (1, 2, 3), the status table of FIG. (2A) provides logic signals at the output of various logic gates, and it is noted that gate (12C) is at value 1 and gate (14C) at value 0, which causes the direction of rotation of motor (45) to be counterclockwise. When the rotation speed of compressor (34) increases, the voltage that is supplied by converter (8) increases, reaching value Z1-ξ, which is close to the value that corresponds to the reference speed that is defined by Zener diode Z1. The signal at input (2B) then exceeds the signal at input (2A) of comparator (2), and output (2C) is at logic level 1. The signals at the inputs of comparator (1) are identical to the preceding case as well as those at comparator (3) since the set temperature is not yet reached. This situation at the inputs of the comparators produces the logic signals that are shown by the status table of FIG. (2B), in which it is possible to see that output (12C) and output (14C) are both at level 1. This has the effect of stopping the rotation of servomotor (45), and plate (31) of the pump remains in the position where it was. It is noted that in this status table, the output of gate (13C) is shifted from logic state 1 to logic state 0, which causes the servomotor to stop because outputs (12C) and (14C) become 1.

When the set temperature is reached, for a constant speed of heat engine or propulsion engine, it is necessary to bring about a reduction in the displacement of the pump in order to reduce the rotation speed of the compressor to a reference value that is defined by Zener diode Z2 and to provide less refrigeration. In this case, the signal at input (3A) becomes smaller than the signal at input (3B), causing the switching of inverter (150) and the connection of output Z to diode Z2. The signal at input (1A) becomes greater than the signal at input (1B), with signal (2A) remaining less than signal (2B). This state of the signals causes the logic states of the various circuits to change as indicated in the Table of FIG. 2C. This causes output (12C) to change to zero and output (14C) to remain at 1, thus causing the servomotor (45) to rotate in a clockwise direction to move plate (31) in the direction of arrow B to bring about a reduction in displacement until the rotation speed for the compressor has reached the desired value of Z2. When set value Z2 is reached, the servomotor stops as in the case of FIG. 2B. As soon as the temperature of the passenger compartment again rises above the set temperature, a shift will again be made to the set speed that is defined by Zener diode Z1 to increase the speed of the compressor until such time as the case shown in FIG. 2C again occurs. Regardless of the variation of the rotation speed of the heat engine or the propulsion engine, the system would alternate between the two values Z1, Z2 as long as the air conditioning is running.

When there are variations of rotation speed of the heat engine or the propulsion engine, situations will arise that correspond to FIGS. 2D and 2E depending on whether speed increases or decreases. If the speed of the heat engine or the propulsion engine increases, it brings about, for a given displacement, an increase in the speed of the hydraulic motor. The signal of input (1A) of comparator (1) becomes greater than signal (1B), the signal at input (2A) will be less than the signal to input (2B), and the values at inputs (3A, 3B) are not decisive. This situation causes the states that are shown in FIG. 2D to appear at the outputs of the logic gates of the circuit. This has the effect of placing output (12C) at logic level 0 and (14C) at logic level 1. The effect of these values is to cause servomotor (45) to rotate in direction (B), bringing about a reduction in the angle of the plate and therefore a reduction of displacement for the pump.

In the case of a reduction in the speed of the heat engine or of the propulsion engine, the conditions at the inputs of comparators (1, 2) are opposite those of the preceding case, and for comparator (3) the conditions are non-determining as above. This has the effect that the output of gate (12C) is at logic level 1 and the output of gate (14C) is at logic level 0. This causes servomotor (45) to rotate in direction (A), bringing about an increase in the angle of the plate, with this direction corresponding to an increase in the displacement of the pump. This case is shown by the status table of FIG. 2E.

Finally, the last situation that can arise corresponds to the shutting off of the air conditioning by closing circuit breaker (26). This shut-off feeds resistor (25) and imposes a logic level 1 on input (7A) of gate (7) at input (9B) of gate (9) and at input (90A) of gate (90).

At the time when circuit breaker (26) was activated, at the outputs of comparators (1, 2, 3), the conditions that were present corresponded to one of the five possible situations that are described above.

Regardless of the output values of comparators (1, 2, 3), the determining values will be those that are set at input (90A) of inverter (90) which will set output (90C) at value 0 and output (6C) at 0 and at input (9B) of gate (9), which will set output (9C) at value 1, imposing on the servomotor a direction of rotation that corresponds to a reduction of displacement of the pump. Gate (7) will have an input (7A) at logic level 1, and its output will move to 1 only when input (7B) has returned to level 1. This will occur when circuit breaker (24) is closed, i.e., when the plate reaches the neutral position. During the entire rest of the time, with output (7C) and input (10A) being at zero, output (10C) will remain at zero. The plate will therefore be brought into the neutral position before the system is stopped, which puts the system into a good position for restarting a refrigeration cycle.

It is understood that this results in the design of a system that makes it possible to overcome one or more drawbacks of the prior art. Thus, the hermetic-type refrigerating set that is driven by a hydraulic motor with a certain displacement, which is itself activated by a variable-displacement hydraulic pump, makes it possible to obtain a better performance level coefficient because a hermetic compressor eliminates the fixture sealing conditions. In addition, owing to its design, a hermetic assembly has a longer service life than the vehicle and does not have to be recharged with refrigerating gas. The constant rotation speed of the compressor makes it possible to obtain a better output, which becomes independent of the rotation speed of the heat engine or propulsion engine. The variable-displacement hydraulic pump does what is necessary to adapt the constant rotation speed of the compressor. The device avoids any abrupt change in torque because when the set temperature is reached, the compressor's rotation speed will be reduced. Therefore, there will no longer be a need to begin the complete thermodynamic cycle again, avoiding the loss of this thermodynamic irreversibility, and there will be no additional electric power consumption because there is no longer an electromagnetic clutch. The selection of the location where the compressor is set up is not limited because the ducts between the hydraulic motor and the pump make it possible to separate the compressor from the high heat sources.

Other modifications within the reach of one skilled in the art are also part of the spirit of the invention.

ANNEX

ANNEX TO FIG. 2A
 Conditions:
 Activation of air conditioning (9B=0; 6D=1)
 Zero compressor speed
 Plate of the hydraulic motor in neutral position
 Temperature of the passenger compartment>set temperature
 1A<1B; 2A>2B; 3A>3B
 Effects:
 Increase in displacement (36A)
 Increase in the speed of the compressor ANNEX TO FIG. 2B
 Conditions:
 Constant heat-engine speed
 Compressor speed reaches the reference speed defined by Z1
 Set temperature not reached
 1A<1B; 2A<2B; 3A>3B
 Effects:
 Stopping of the servomotor ANNEX TO FIG. 2C
 Conditions:
 Set temperature reached
 Constant heat engine speed
 1A>1B; 2A<2B; 3A<3B
 Effects:
 Reduction in displacement (36B)
 Compressor speed defined by the reference given by Z2 (Z2<Z1)

ANNEX TO FIG. 2D
 Conditions:
 Heat engine speed increases, causing the speed of the hydraulic motor of the compressor to rise
 1A>1B; 2A<2B; 3A>3B or 3A<3B (3C not being determining)
 Effects:
 Reduction in displacement (36B)
 if motor speed>reference voltage (Z1 or Z2)

ANNEX TO FIG. 2E
 Conditions:
 Heat engine speed decreases
 1A<1B; 2A>2B; 3A<3B or 3A>3B
 Effects:
 Increase in displacement (36A)

ANNEX TO FIG. 2F
 Conditions:
 Air conditioning is off (9B=1; 6D=0)
 1A, 1B; 2A, 2B; 3A, 3B, not determining
 Effects:
 Reduction in displacement (36B) forced by 9B (direction of rotation imposed) that causes a reduction in the speed of the compressor motor
 stopping of the servomotor when the plate is at the neutral point (7B=1)

I claim:

1. A motor vehicle air conditioning control system having a hermetic compressor, said system comprising:
    a variable-displacement pump coupled to one side to a prime mover and on the other side to a fixed-displacement hydraulic motor having a shaft and connected to the compressor, the variation in displacement of said pump being accomplished by altering the inclination of a plate of the variable displacement pump, a servomotor controlled by an electronic logic and coupled to said plate for altering the inclination of said plate, said electronic logic controlling said servomotor to rotate said hermetic compressor at a speed substantially corresponding to a nominal speed of the compressor.

2. An air conditioning control system according to claim 1, including a sensor for measuring the speed of rotation of said hydraulic motor shaft and providing a signal representative thereof, and a first comparator of said electronic logic for receiving said signal and changing the direction of movement of plate of the variable-displacement pump in response thereto as a function of changes in speed of the hydraulic motor relative to a predetermined speed corresponding to the nominal speed of the compressor.

3. An air conditioning control system according to claim 1, wherein an end-of-travel circuit breaker of the plate signals a neutral position of the plate, said servomotor being stopped in response to said neutral position signal.

4. An air conditioning control system according to claim 1, including a regulation system for causing displacement of the pump to vary as a function of a predetermined temperature measured in a passenger compartment by a sensor.

5. A motor vehicle air conditioning control system having a hermetic compressor, said system comprising:

a variable-displacement pump coupled to one side to a prime mover and on the other side to a fixed-displacement hydraulic motor connected to the compressor, the variation in displacement of said pump being accomplished by altering the inclination of a plate of the variable displacement pump, a servomotor controlled by an electronic logic and coupled to said plate for altering the inclination of said plate, said electronic logic controlling said servomotor to rotate said hermetic compressor at a speed substantially corresponding to a nominal speed of the compressor; and a second comparator of said electronic logic for determining a first speed close to the nominal speed of the compressor and less than the nominal speed of the compressor when the predetermined temperature has been reached, said servomotor changing the displacement of the pump in a direction opposite that of the variation of the speed of the pump, said second comparator also determining a second speed corresponding to the nominal speed.

6. A motor vehicle air conditioning control system having a hermetic compressor, said system comprising:

a variable-displacement pump coupled to one side to a prime mover and on the other side to a fixed-displacement hydraulic motor connected to the compressor, the variation in displacement of said pump being accomplished by altering the inclination of a plate of the variable displacement pump, a servomotor controlled by an electronic logic and coupled to said plate for altering the inclination of said plate, said electronic logic controlling said servomotor to rotate said hermetic compressor at a speed substantially corresponding to a nominal speed of the compressor;

a sensor device for measuring the speed of rotation of said hydraulic motor shaft and providing a signal representative thereof, and a first comparator of said electronic logic for receiving said signal and changing the direction of movement of the plate of the variable-displacement pump in response to said signal as a function of changes in speed of the hydraulic motor relative to a predetermined speed corresponding to the nominal speed of the compressor; and said electronic logic having a third comparator for determining a range for two different speeds and providing an output signal in response thereto for stopping said servomotor thereby maintaining the displacement of the pump constant.

* * * * *